United States Patent [19]

Crook et al.

[11] 3,870,661

[45] Mar. 11, 1975

[54] FOAMED REACTION PRODUCT OF A RESOLE WITH A SULFONATED NOVOLAC

[75] Inventors: Peter John Crook, Billinge; Stephen Philip Riley, Saint Helens, both of England

[73] Assignee: Pilkington Brothers Limited, Liverpool, England

[22] Filed: July 28, 1972

[21] Appl. No.: 275,999

[30] Foreign Application Priority Data

July 30, 1971 Great Britain.................... 36015/71

[52] U.S. Cl.............. 260/2.5 F, 260/49, 260/57 A, 260/838
[51] Int. Cl........................... C08g 53/08, C08j 1/26
[58] Field of Search.................... 260/838, 2.5 F, 49

[56] References Cited
UNITED STATES PATENTS

| | | | |
|---|---|---|---|
| 2,179,038 | 11/1939 | Guthke............................... | 260/838 |
| 3,207,652 | 9/1965 | Shannon........................... | 260/2.5 F |
| 3,389,094 | 6/1968 | D'Alesandro..................... | 260/2.5 F |
| 3,511,789 | 5/1970 | Shannon et al.................. | 260/2.5 F |

*Primary Examiner*—Morton Foelak
*Attorney, Agent, or Firm*—Sughrue, Rothwell, Mion, Zinn & Macpeak

[57] ABSTRACT

Phenol-formaldehyde resins, which are principally intended for the production of resin foams for use as insulating materials, in particular fire-resistant foams, are produced by reacting a sulphonated novolac resin, which has been condensed from at least one phenol and formaldehyde and subsequently sulphonated, with a resole resin. The novolac resin may be condensed from 1 mole of the phenol or phenols and between 0.3 and 1.0 moles formaldehyde in the presence of an organic acid, such as oxalic acid, and subsequently sulphonated with 0.1 to 1.5 moles 98% sulphuric acid at a temperature not exceeding 150°C. The resole resin may be condensed from 1 mole of a phenol or phenols and 1 to 3 moles formaldehyde in the presence of an alkaline catalyst. An aqueous dispersion of the resole resin is reacted with the sulphonated novolac resin, the viscosities of the two reactants being adjusted to be of the same order of magnitude, e.g. by diluting the sulphonation product with water. A surfactant and a foaming agent are added to the reaction mixture to cause foam formation.

37 Claims, No Drawings

FOAMED REACTION PRODUCT OF A RESOLE WITH A SULFONATED NOVOLAC

BACKGROUND OF THE INVENTION

1. Field of the Invention

This invention relates to phenol-formaldehyde resins and particularly, though not exclusively, to such resins which can be used in the production of resin foams, e.g. for use as insulating materials.

2. Description of the Prior Art

In co-pending U.S. Pat. Application Ser. No. 123851 filed Mar. 12 1971, certain phenol-formaldehyde resins are described and claimed comprising the product of reaction of 1 part by weight of a composition produced by reacting a phenol with concentrated sulphuric acid in the ratio 0.8 to 1.5 moles of sulphuric acid per mole of the phenol, and then adding per mole of the phenol a quantity of formaldehyde in the range having a lower limit of 0.3 moles and an upper limit of 0.8 moles when using 0.8 moles of sulphuric acid and decreasing to 0.5 moles when using 1.5 moles of sulphuric acid; with from 0.1 to 8 parts by weight of a phenol-formaldehyde resole produced by reacting a phenol and formaldehyde in the ratio of at least 0.9 moles of formaldehyde per mole of the phenol in the presence of a basic catalyst.

SUMMARY OF THE INVENTION

It is a main object of the present invention to porvide improved phenol-formaldehyde resins for use as insulating materials.

According to the present invention we provide a phenol-formaldehyde resin comprising the product of reacting a sulphonated novolac resin, which has been condensed from at least one phenol and formaldehyde and subsequently sulphonated so as to contain sulphonic acid groups, with a resole resin.

Some of the sulphonic acid groups of the resin can be neutralised to give a sulphonate metal salt or can be reacted with an organic base.

The invention also includes the method of producing a phenol-formaldehyde resin comprising condensing a novolac resin from at least one phenol and formaldehyde, sulphonating the novolac resin so that it contains sulphonic acid groups, and reacting the sulphonated novolac resin with a resole resin.

In this Specification, the terms "novolac resin" and "resole resin" are used in accordance with the following definitions.

A novolac resin is a resin produced from 1 mole of a phenol or a mixture of phenols and not more than 1 mole of an aldehyde or mixture of aldehydes, at a pH not greater than 7, the resin being characterised in that it is in a thermoplastic condition and hardenable by treatment with a cross-linking agent, and is further characterised in that polymeric chains present in the resin have ends which do not contain hydroxymethyl or substituted hydroxymethyl groups. A resole resin is a resin produced from a phenol or mixture of phenols and an aldehyde or mixture of aldehydes in the presence of an alkaline catalyst (the molar proportion of aldehyde being not normally less than the molar proportion of phenol) characterised in that it contains hydroxymethyl or substituted hydroxymethyl groups.

Although the precise formulation of the composition resulting from the reaction of a phenol with sulphuric acid and subsequent addition of formaldehyde, as described in U.S. Pat. Application No. 123,851 is not known, it is believed to be distinctly different from that of the sulphonated novolac resin used in the present invention, which has essentially been condensed from a phenol and formaldehyde and subsequently sulphonated so as to contain sulphonic acid groups.

The condensation of the novolac resin may be effected in the proportions of 1 mole of the phenol or phenols to between 0.3 and 1.0 moles formaldehyde in acid conditions. Preferably the condensation is effected in the presence an organic acid. The organic acid may be oxalic acid, for example.

The sulphonation of the novolac resin is preferably effected by reaction of the condensed novolac resin with sulphuric acid in the proportion of 0.1 to 1.5 moles of sulphuric acid to 1 mole of the phenol or phenols used to form the novolac resin. 98% sulphuric acid may be used, and the sulphonation is preferably carried out at a temperature not exceeding 150°C.

Preferably the viscosity of the product of the sulphonation is adjusted by dilution with water to a value of less than 100 poises at 20°C, before reaction with the resole resin, the preferred value of the viscosity being less than 80 poises at 20°C.

The reaction between the sulphonated novolac resin and the resole resin is preferably carried out using an aqueous dispersion of the resole resin resulting from the condensation of at least one phenol and formaldehyde in the presence of an alkaline catalyst.

The resole resin is preferably condensed from at least one phenol and formaldehyde in the presence of an alkaline catalyst, in the proportions of 1 to 3 moles formaldehyde to 1 mole of the phenol used to form the resole resin.

It is of considerable assistance in mixing the sulphonated novolac resin and the resole resin if their viscosities, before reaction, are of the same order of magnitude. Dilution of the sulphonation product and the condensation of the resole resin are therefore preferably carried out with this end in view.

The molar proportions in which the sulphonated novolac resin and the resole resin are reacted may vary widely, from 100:1 to 1 : 100, the preferred range of proportions lying between 20 : 1 and 1 : 20. When the resole content is low, e.g. with proportions between 100 : 1 and 20 : 1, a cross-linking agent may be added to the reaction mixture.

To produce a solid foam, a surfactant and a foaming agent may be added to the reaction mixture of the sulphonated novolac resin and the resole resin. Alternatively surfactants and foaming agents may be added to either resin or to both resins or may be added at the resin mixing stage.

The surfactant may be a silicone oil and the foaming agent may be a low boiling aliphatic hydrocarbon or a halogenated derivative of such a hydrocarbon. The exothermic heat produced during the reaction may be used to activate the foaming agent.

DETAILED DESCRIPTION OF THE INVENTION

The invention is particularly suitable for the production of new phenol-formaldehyde resin foams which can be used, for example, as fire-resistant insulating materials.

The examples now to be described are essentially produced by first forming a novolac resin by condensing phenol with formaldehyde in molar proportions of between 1 : 0.3 and 1 : 1.0 in the presence of between 0.008 and 0.025 moles oxalic acid, though other catalysts such as zinc acetate or mineral acids may be used. This reaction is known. Generally it is intitated by heating the mixture to between 75°C and 110°C, whereupon the exothermic reaction usually causes a further temperature rise. The reaction may be continued for between one/fourth hour and 2 hours according to the materials used and the temperature maintained. The reaction mixture containing the condensed novolac resin is then cooled to between 60° and 75°C and sulphonated by reaction with from 0.1 to 1.5 moles of 98% sulphuric acid at a temperature between 100° and 150°C for 30 to 60 minutes, finally diluting the resultant product with water to adjust its viscosity. Table 1 gives Examples A1 to A23 of sulphonated novolac resins produced in this manner, showing the solids content and viscosity of the diluted product. The viscosity should be less than 100 poises at 20C and preferably less than 80 poises. The formaldehyde used may be at least partly in its polymerised form of paraformaldehyde (abbreviated as p.f.a. in Table 1).

TABLE I

| Composition No. | Phenol (moles) | Formaldehyde (moles) | Acid Catalyst (Oxalic Acid except where stated otherwise) (moles) | Condensation Time and Temp. | Cool Resin To °C | 98% $H_2SO_4$ (moles) | Sulphonation Time and Temperature | Moles Water added to adjust Viscosity | Solids % | Viscosity (poises at 20°C) |
|---|---|---|---|---|---|---|---|---|---|---|
| A1 | 1 phenol | 0.6 (37% Formalin) | 0.02 | 100°C for 1 hr. | — | 0.54 | 100–120°C for 30 minutes | 1.94 | 64.8 | 12 |
| A2 | 1 phenol | 0.6 | 0.02 | 100°C for 80 min. | 70 | 0.6 | 110–135°C for 40 minutes | 3.3 | 72.5 | 16 |
| A3 | 1 phenol | 0.6 (87% p.f.a.) | 0.015 | 80–130°C for 65 min. | 60 | 0.8 | 135°C for 10 minutes 120°C for 20 minutes | 2 | 74.3 | 30 |
| A4 | 1 phenol | 0.5 (82% p.f.a.) | 0.023 | 80–120°C for 30 min. | 70 | 0.4 | 110–130°C for 30 minutes | 5.6 | 58 | 5 |
| A5 | 1 phenol | 0.4 (87% p.f.a.) | 0.01 | 80–100°C for 120 min. | 60 | 0.5 | 100–120°C for 60 minutes | 5.6 | 74.7 | |
| A6 | 1 phenol | 0.6 (82% p.f.a.) | 0.01 (Zinc Acetate) | 100–110°C for 120 min. | 60 | 0.6 | 120°C for 40 minutes | 2.8 | 75.0 | 28.6 |
| A7 | 1 phenol | 0.6 (87% p.f.a.) | 0.016 | 100°C for 30 min. | 60 | 0.3 | 120°C for 40 minutes | 3.5 | 68.7 | 83 |
| A8 | 1 phenol | 0.7 (82% p.f.a.) | 0.015 | 80–105°C for 45 min. | 70 | 0.5 | 115–120°C for 30 minutes | 3.0 | 69.3 | 51 |
| A9 | 1 phenol | 0.8 (82% p.f.a.) | 0.015 | 90–110°C for 15 min. | 65 | 0.4 | 120°C for 30 minutes | 2.8 | 62.3 | 50 |
| A10 | 1 phenol | 0.6 (82% p.f.a.) | 0.015 | 80–110°C for 15 min. | 60 | 0.1 | 120°C for 30 minutes | 1.4 | 66.0 | 48.3 |
| A11 | 1 phenol | 0.6 (87% p.f.a.) | 0.016 | 100°C for 30 min. | 70 | 0.2 | 110–130°C for 30 minutes | 2.8 | 60 | 39 |
| A12 | 1 phenol | 0.7 (82% p.f.a.) | 0.015 | 85°C for 60 min. | 60 | 0.7 | 125–130°C for 40 minutes | 2.8 | 67.3 | 15 |
| A13 | 1 phenol | 0.3 (82% p.f.a.) | 0.02 | 85°C for 60 min. | 65 | 0.6 | 120°C for 45 minutes | 2.8 | 69.3 | 10 |
| A14 | 1 phenol | 0.6 (82% p.f.a.) | 0.012 | 85°C for 90 min. | 70 | 1 | 130°C for 30 minutes | 2.8 | 75 | 35 |
| A15 | 1 phenol | 0.7 (82% p.f.a.) | 0.012 | 85–90°C for 90 min. | 70 | 1.5 | 120–130°C for 35 minutes | 2.8 | 72 | 11 |
| A16 | 1 phenol | 0.9 (82% p.f.a.) | 0.008 | 75°C for 60 min. | 70 | 0.4 | 120°C for 30 minutes | 4.2 | 52.8 | 15.6 |
| A17 | 1 phenol | 1.0 (82% p.f.a.) | 0.016 | 85–90°C for 90 min. | 75 | 0.3 | 120°C for 30 minutes | 5.6 | 40.3 | 95 |
| A18 | 1 phenol | 0.6 (82% p.f.a.) | 0.025 | 80°C for 60 min. | 70 | 0.6 | 110°C for 30 minutes | 1.7 | 70.8 | 25 |
| A19 | 1 phenol | 0.7 (82% p.f.a.) | 0.012 | 75°C for 60 min. | 70 | 0.3 | 150°C for 30 minutes | 2.8 | 70.5 | 70 |
| A20 | 0.5 phenol 0.5 o-cresol | 0.7 (82% p.f.a.) | 0.012 | 80°C for 60 min. | 65 | 0.5 | 110°C for 30 minutes | 2.8 | 57.4 | 18 |
| A21 | 0.5 phenol 0.5 p-cresol | 0.7 (82% p.f.a.) | 0.012 | 75°C for 45 min. | 60 | 0.25 | 125°C for 30 minutes | 4.0 | 53.2 | 31 |
| A22 | 0.91 phenol 0.09 resorcinol | 0.55 (82% p.f.a.) | 0.015 | 75°C for 60 min. | 60 | 0.27 | 115°C for 30 minutes | 5.5 | 60.1 | 18.2 |

TABLE I – Continued

| Composition No. | Phenol (moles) | Formaldehyde (moles) | Acid Catalyst (Oxalic Acid except where stated otherwise) (moles) | Condensation Time and Temp. | Cool Resin To °C | 98% H₂SO₄ (moles) | Sulphonation Time and Temperature | Moles Water added to adjust Viscosity | Solids % | Viscosity (poises at 20°C) |
|---|---|---|---|---|---|---|---|---|---|---|
| A23 | 0.75 phenol 0.25 m-cresol | 0.7 (82% p.f.a.) | 0.012 | 75°C for 60 min. | 60 | 0.3 | 120°C for 30 minutes | 5.5 | 48.0 | 11.2 |

IN Example A1 the reaction product of phenol and formalin (the novolac resin), instead of being cooled, was concentrated by evaporation under reduced pressure until the product had a solids content of 79% and a viscosity of 360 poises at 20° C. Then the concentrated resin was mixed with 0.54 moles of 98% sulphuric acid and the sulphonation reaction proceeded as set out in Table 1.

In the above examples, except Example A1, it has been found convenient to cool the reaction product before sulphonation, but such a step is not an essential one.

In some cases, it may be desirable to neutralise some of the sulphonic acid groups in the sulphonated novolac, to give a sulphonate metal salt, or to react some of them with an organic base.

The sulphonated novolac resin is reacted with a resole resin, with the addition of a surfactant and a foaming agent. The resole resin is produced by condensing a phenol or mixture of phenols with formaldehyde, which may be in the form of an aqueous 37% solution (formalin) or at least partly in its polymeric form of paraformaldehyde, in the proportions of 1 mole phenol to 1 to 3 moles formaldehyde, in the presence of an alkaline catalyst, e.g. barium hydroxide or sodium hydroxide. After the condensation, the mixture has its pH adjusted with sulphuric acid to a pH of preferably about 7. In practice it has been found convenient to operate between pH 6 and pH 8.

Table II shows Examples B1 to B9 of the production of such a resole resin, with the solids content and viscosity of the products.

TABLE II

| Composition No. | Phenol (moles) | Formalin (37%) (moles) | Paraformaldehyde (moles) | Total Formaldehyde (moles) | Alkaline Catalyst (moles) | Condensation Time and Temperature | Solids % | Viscosity (poises) at 20°C |
|---|---|---|---|---|---|---|---|---|
| B1 | 1 phenol | 0.08 | 2.38 (87%) | 2.46 | 0.02 Ba(OH)₂ | 2½ hrs. – 45°C<br>2 hrs. – 60°C<br>1½ hrs. – 70°C | 76 | 13 |
| B2 | 1 phenol | 0.08 | 1.62 (87%) | 1.7 | 0.02 Ba(OH)₂ | 2 hrs. – 43°C<br>2 hrs. – 63°C<br>1½ hrs. – 71°C | 68 | 12 |
| B3 | 1 phenol | 0.08 | 1.89 (87%) | 1.97 | 0.04 NaOH | 2 hrs. – 46°C<br>2 hrs. – 60°C<br>1 hr. 50 mins.– 74°C | 68.5 | 7.0 |
| B4 | 1 phenol | 3.00 | — | 3.00 | 0.02 NaOH | 2½ hrs. – 60°C add urea 0.5 mole<br>1 hr. – 75°C<br>1½ hrs. – 80°C concentrate by evaporation under reduced pressure. | 73.3 | 27 |
| B5 | 1 phenol | — | 3.00 (82%) | 3.00 | 0.01 NaOH | 1¼ hrs. – 85°C | 71.2 | 12 |
| B6 | 1 phenol | — | 1.00 (82%) | 1.00 | 0.02 NaOH | 2½ hrs. – 85°C | 78.2 | |
| B7 | 0.5 phenol 0.5 o-cresol | — | 2.00 (82%) | 2.00 | 0.0125 NaOH | 1 hr. – 55°C<br>1½ hrs. – 65°C<br>1 hr. – 75°C | 73.9 | 35.2 |
| B8 | 0.5 phenol 0.5 m-cresol | — | 2.00 (82%) | 2.00 | 0.0125 NaOH | 1½ hrs. – 55°C<br>2 hrs. – 65°C<br>1 hr. – 75°C | 71.7 | 10.0 |
| B9 | 0.5 phenol 0.5 p-cresol | — | 2.00 (82%) | 2.00 | 0.0125 NaOH | 1 hr. – 55°C<br>1¾ hrs. – 65°C<br>1 hr. – 75°C | 61.6 | 3.4 |

It will be seen that the viscosities of the resole resins in Table II range from 3.4 to 35.2 poises at 20°C and are of the same order of magnitude as those of the sulphonated novolac resins of Table I. This greatly facilitates the mixing of these resins for producing the desired resin foam.

The molar proportions in which the resins may be mixed (with the addition of the surfactant and the foaming agent) to produce the foams varies widely. Table III shows 41 Examples, identified as F1 to F41, of the mixing of various examples of sulphonated novolac resins (A2 to A11 and A13, A14 and A15 from Table I) with examples of resole resins (B1 to B6 from Table III) in proportions ranging from 100 : 1 to 1 : 100. A preferred range of proportions, giving foams with good fire-resistant properties, is from 20 : 1 to 1 : 20.

TABLE III

| | | |
|---|---|---|
| F 1 A1 + B1 1:1 | F14 A4 + B3 1:5 | F27 A8 + B1 1:2 |
| F 2 A2 + B1 1:1 | F15 A4 + B3 1:8 | F28 A9 + B1 1:5 |
| F 3 A3 + B1 1:1 | F16 A4 + B3 1:50 | F29 A9 + B1 20:1 |
| F 4 A3 + B1 1:2 | F17 A4 + B3 1:100 | F30 A9 + B1 50:1 |
| F 5 A3 + B1 1:3 | F18 A5 + B3 1:20 | F31 A9 + B1 100:1 |
| F 6 A3 + B1 2:1 | F19 A5 + B3 1:33 | F32 A10 + B1 1:1 |
| F 7 A3 + B2 1:9 | F20 A6 + B3 1:1 | F33 A11 + B3 1:100 |
| F 8 A3 + B2 1:50 | F21 A6 + B3 1:10 | F34 A6 + B1 10:1 |
| F 9 A3 + B2 1:50 | F22 A6 + B1 3:1 | F35 A9 + B3 1:1 |
| F10 A4 + B3 1:50 | F23 A6 + B1 4:1 | F36 A6 + B4 1:1 |
| F11 A3 + B2 1:20 | F24 A6 + B1 5:1 | F37 A3 + B5 1:4 |
| F12 A4 + B3 1:10 | F25 A7 + B1 2:1 | F38 A3 + B6 3½:1 |
| F13 A4 + B3 1:10 | F26 A7 + B1 1:1 | F39 A13 + B3 1:1 |
| | | F40 A14 + B1 1:5 |
| | | F41 A15 + B1 1:5 |

Further particulars of the production of foams F1 to F41, and of eleven further foams identified as F42 to F52, are set out in Table IV which shows the nature and amount in parts by weight of the sulphonated novolac, resole, surfactant and foaming agent used in each case, together with the reaction temperature and the density of the resultant foam.

When the resole content is low as in Example F29, F30 and F31, a cross-linking agent for example hexamethylene tetramine is preferably added. This may also be added, as in Example F38, when the proportion of formaldehyde in the resole is relatively low.

TABLE IV

| Composition No. | Novolac | (Parts by weight) | Resole | (Parts by weight) | Surfactant | Parts by weight | Foaming Agent | (Parts by weight) | Reaction Temperature °C | Resultant Foam Density (lb/cu.ft.) |
|---|---|---|---|---|---|---|---|---|---|---|
| F1 | A1 | 40 | B1 | 40 | Silicone Y 6252 | 1.7 | Arcton 11 | 12 | 40 | 2.2 |
| F2 | A2 | 40 | B1 | 40 | Silicone Y 6252 | 1.7 | Arcton 11 | 12 | 15 | 1.9 |
| F3 | A3 | 25 | B1 | 25 | Silicone Y 6252 | 0.7 | Arcton 11 | 6 | 15 | 5.7 |
| F4 | A3 | 17 | B1 | 34 | Silicone Y 6252 | 0.7 | Arcton 11 | 6 | 40 | 2.6 |
| F5 | A3 | 13 | B1 | 39 | Silicone Y 6252 | 0.7 | Arcton 11 + Arcton 113 | 4 2 | 40 | 2.8 |
| F6 | A3 | 34 | B1 | 17 | Silicone Y 6252 | 0.7 | Arcton 11 | 6 | 15 | 9.1 |
| F7 | A3 | 5 | B2 | 45 | Silicone Y 6252 | 1 | Arcton 11 + Arcton 113 | 4 2 | 65 | 1.98 |
| F8 | A3 | 1 | B2 | 50 | Silicone Y 6252 | 1 | Arcton 113 | 4.7 | 65 | 1.84 |
| F9 | A3 | 1 | B2 | 50 | Silicone Y 6252 | 1 | Hexane | 4 | 65 | 1.6 |
| F10 | A4 | 1 | B3 | 50 | Silicone L 5320 | 1 | Arcton 11 | 6 | 20 | 2.8 |
| F11 | A3 | 1 | B2 | 20 | Silicone L 5320 | 0.4 | Arcton 113 | 4 | 80 | 1.1 |
| F12 | A4 | 1 | B3 | 10 | Tween 40 | 0.3 | n-pentane | 1.25 | 60 | 2.0 |
| F13 | A4 | 1 | B3 | 10 | Tween 40 | 0.3 | n-pentane | 2.7 | 60 | 0.7 |
| F14 | A4 | 5 | B3 | 25 | Silicone L 5320 | 0.7 | n-pentane | 2.5 | 60 | 2.0 |
| F15 | A4 | 3 | B3 | 24 | Tween 40 | 0.7 | n-pentane | 2.5 | 60 | 4 |
| F16 | A4 | 0.5 | B3 | 25 | Silicone L 5320 | 0.5 | n-pentane | 3 | 60 | 0.7 |
| F17 | A4 | 0.25 | B3 | 25 | Silicone L 5320 | 0.5 | Hexane | 2.5 | 65 | 8.7 |
| F18 | A5 | 1.5 | B3 | 30 | Silicone L 5320 | 1.3 | Arcton 11 + Arcton 113 | 4 2 | 60 | 1.8 |
| F19 | A5 | 1.5 | B3 | 50 | Silicone L 5320 | 1.5 | Arcton 113 | 5 | 100 | 2.0 |
| F20 | A6 | 25 | B3 | 25 | Silicone L 5320 | 0.7 | Arcton 113 | 7 | 40 | 2.7 |
| F21 | A6 | 3 | B3 | 30 | Silicone L 5320 | 0.9 | n-pentane | 5.5 | 65 | 2.1 |
| F22 | A6 | 30 | B1 | 10 | Tween 40 | 0.7 | Arcton 11 | 7 | 40 | 2.4 |
| F23 | A6 | 40 | B1 | 10 | Tween 40 | 0.9 | Arcton 11 | 8 | 40 | 2.6 |
| F24 | A6 | 25 | B1 | 5 | Tween 40 | 0.7 | Arcton 11 | 3 | 40 | 3.2 |
| F25 | A7 | 32 | B1 | 16 | Silicone L 5320 | 0.7 | Arcton 11 | 5 | 20 | 3.0 |
| F26 | A7 | 25 | B1 | 25 | Silicone L 5320 | 0.7 | Arcton 11 | 5 | 20 | 2.9 |
| F27 | A8 | 160 | B1 | 320 | Silicone L 5320 | 9 | Arcton 11 | 50 | 20 | 2.7 |
| F28 | A9 | 10 | B1 | 50 | Silicone L 5320 | 2 | Carbon tetrachloride | 5 | 80 | 2.3 |
| F29 | A9 | 30 treated with hexamethylene tetramine 1.2 | B1 | 1.5 | Tween 40 | 0.9 | Arcton 113 | 7 | 80 | 1.5 |
| F30 | A9 | 25 treated with hexamethylene tetramine 1 | B1 | 0.5 | Tween 40 | 0.5 | Arcton 113 | 6 | 80 | 2.7 |
| F31 | A9 | 25 treated with hexamethylene | B1 | 0.25 | Tween 40 | 0.5 | Arcton 113 | 6 | 80 | 3.2 |

TABLE IV – Continued

| Composition No. | Novolac | (Parts by weight) | Resole | (Parts by weight) | Surfactant | Parts by weight | Foaming Agent | (Parts by weight) | Reaction Temperature °C | Resultant Foam Density (lb/cu.ft.) |
|---|---|---|---|---|---|---|---|---|---|---|
| | | tetramine 1 | | | | | | | | |
| F32 | A10 | 25 | B1 | 25 | Silicone L 5320 | 0.7 | Arcton 11 + Arcton 113 | 4 2 | 20 | 2.1 |
| F33 | A11 | 0.25 | B3 | 25 | Silicone L 5320 | 0.8 | Benzene sulphonyl hydrazide | 2.5 | 110 | 2.2 |
| F34 | A6 | 30 | B1 | 3 | Tween 40 | 0.9 | n-pentane | 5.5 | 60 | 2.5 |
| F35 | A9 | 25 | B3 | 25 | Silicone L 5320 | 0.7 | Arcton 11 | 7 | 20 | 2.5 |
| F36 | A6 | 25 | B4 | 25 | Silicone L 5320 | 0.7 | Arcton 11 | 5 | 20 | 2.5 |
| F37 | A3 | 10 | B5 | 40 | Silicone L 5320 | 1.5 | Arcton 11 | 7 | 60 | 2.5 |
| F38 | A3 | 70 treated with Ca(OH)$_2$ 2.5 and hexamethylene tetramine 7 | B6 | 20 | Silicone L 5320 | 2 | Arcton 113 | 12 | 20 hardened at 100 | 8.1 |
| F39 | A13 | 25 | B3 | 25 | Silicone L 5320 | 0.7 | Arcton 11 | 5 | 20 | 7.0 |
| F40 | A14 | 11 | B1 | 55 | Silicone L 5320 | 1 | Arcton 11 | 6 | 60 | 9.9 |
| F41 | A15 | 5 | B1 | 50 | Silicone L 5320 | 0.8 | Arcton 11 | 7 | 60 | 5.9 |
| F42 | A16 | 25 | B3 | 25 | Silicone L 5320 | 0.7 | Arcton 11 | 8 | 20 | 4.2 |
| F43 | A17 | 34 | B3 | 17 | Silicone L 5320 | 0.7 | Arcton 11 | 8 | 60 | 5.8 |
| F44 | A18 | 18.7 treated with CaO 1.3 | B3 | 40 | Silicone L 5320 | 1 | Arcton 11 + Arcton 113 | 10 5 | 20 | 2.0 |
| F45 | A19 | 25 | B3 | 25 | Silicone L 5320 | 0.7 | Arcton 11 | 8 | 20 | 3.3 |
| F46 | A20 | 25 | B3 | 25 | Silicone L 5320 | 0.7 | Arcton 11 | 5 | 20 | 2.9 |
| F47 | A21 | 25 | B3 | 25 | Silicone L 5320 | 0.7 | Arcton 11 | 5 | 20 | 5.4 |
| F48 | A22 | 32 | B3 | 16 | Silicone L 5320 | 0.7 | Arcton 11 | 5 | 20 | 3.8 |
| F49 | A23 | 32 | B3 | 16 | Silicone L 5320 | 0.7 | Arcton 11 | 5 | 20 | 3.8 |
| F50 | A18 | 25 | B7 | 25 | Silicone L 5320 | 0.7 | Arcton 11 | 5 | 20 | 3.8 |
| F51 | A18 | 25 | B8 | 25 | Silicone L 5320 | 0.7 | Arcton 11 | 5 | 20 | 5.1 |
| F52 | A18 | 25 | B9 | 25 | Silicone L 5320 | 0.7 | Arcton 11 | 5 | 20 | 1.8 |

The surfactants identified in Table IV as Silicone Y 6252 and Silicone L 5320, are Silicone oils. Tween 40 is a polyoxyethylene sorbitan monopalmitate manufactured by Honeywill-Altas.

The foaming agent Arcton 11 is $CCl_3F$, and Arcton 113 is $CFCL_2CF_2CL$ both made by I.C.I. Limited.

What is claimed is:

1. A foamed phenol-formaldehyde resin comprising the product of condensing at least one phenol with formaldehyde in proportions of 1 mole phenol to not more than 1 mole formaldehyde, at a pH not greater than 7, to form a novolac resin, subsequently sulphonating the novolac resin so as to incorporate sulphonic acid groups therein, and reacting said sulphonated novolac resin with a resole resin in the presence of a surfactant and a foaming agent to form said solid foam.

2. A foamed resin according to claim 1, wherein the sulphonated novolac resin contains sulphonic acid groups which have been neutralized to give a sulphonate metal slat, or have been reacted with an organic base.

3. A foamed resin according to claim 1, wherein the condensation of the novolac resin has been effected in the proportions of 1 mole phenol to between 0.3 and 1.0 moles formaldehyde in acid conditions.

4. A foamed resin according to claim 3, wherein the condensation has been effected in the presence of an organic acid.

5. A foamed resin according to claim 4, wherein the organic acid is oxalic acid.

6. A foamed resin according to claim 1 produced by a process wherein the sulphonation of the novolac resin is effected by reaction of the condensed novolac resin with sulphuric acid in the proportion of 0.1 to 1.5 moles of sulphuric acid to 1 mole of the phenol used to form the novolac resin.

7. A foamed resin according to claim 6 produced by a process wherein the sulphonation is carried out using 98% sulphuric acid.

8. A foamed resin according to claim 7, produced by a process wherein the sulphonation is carried out at a temperature not exceeding 150°C.

9. A foamed resin according to claim 1, produced by a process wherein the viscosity of the product of the sulphonation is adjusted by dilution with water to a value of less than 100 poises at 20°C, before reaction with the resole resin.

10. A foamed resin according to claim 9, produced by a process wherein the said viscosity is adjusted to less than 80 poises at 20°C.

11. A foamed resin according to claim 1, wherein the resole resin has been condensed from at least one phenol and formaldehyde in the presence of an alkaline catalyst, in the proportions of 1 to 3 moles formaldehyde to 1 mole of the phenol used to form the resole resin.

12. A foamed resin according to claim 1, produced by reacting the sulphonated novolac resin and the resole resin in molar proportions of between 100 : 1 and 1 : 100.

13. A foamed resin according to claim 2, wherein the said proportion lies between 20 : 1 and 1 : 20.

14. A foamed resin according to claim 2, produced by reacting the sulphonated novolac resin with the resole resin in molar proportions of between 100 : 1 and 20 : 1, with the addition of a cross-linking agent.

15. A foamed resin according to claim 1, wherein the surfactant is a silicone oil.

16. A foamed resin according to claim 1, wherein the foaming agent is a lowing boiling aliphatic hydrocarbon.

17. A foamed resin according to claim 1, wherein the foaming agent is a halogenated derivative of a low boiling aliphatic hydrocarbon.

18. A method of producing a foamed phenol-formaldehyde resin, comprising the step of condensing at least one phenol and formaldehyde, in proportions of 1 mole phenol to not more than 1 mole formaldehyde at a pH not greater than 7 to form a novolac resin, sulphonating said novolac resin so that it contains sulphonic acid groups, and reacting said sulphonated novolac resin with a resole resin the presence of a surfactant and a foaming agent, to form a solid foam.

19. A method according to claim 8, wherein a portion of the sulphonic acid groups in the sulphonated novolac resin are neutralized to give a sulphonate metal salt, or are reacted with an organic base.

20. A method according to claim 18, wherein the condensation of the novolac resin is effected in the proportions of 1 mole phenol to between 0.3 and 1.0 moles formaldehyde in acid conditions.

21. A method according to claim 20, wherein the condensation is effected in the presence of an organic acid.

22. A method according to claim 21, wherein the organic acid is oxalic acid.

23. A method according to claim 18, wherein the sulphonation of the novolac resin is effected by reaction of the condensed novolac resin with sulphuric acid in the proportion of 0.1 to 1.5 moles of sulphuric acid to 1 mole of the phenol used to form the novolac resin.

24. A method according to claim 23, wherein the sulphonation is carried out using 98% sulphuric acid.

25. A method according to claim 24, wherein the sulphonation is carried out at a temperature not exceeding 150°C.

26. A method according to claim 18, wherein the viscosity of the product of the sulphonation is adjusted by dilution with water to a value of less than 100 poises at 20°C before reaction with the resole resin.

27. A method according to claim 26, wherein the said viscosity is adjusted to less than 80 poises at 20°C.

28. A method according to claim 18, wherein the reaction between the sulphonated novolac resin and the resole resin is carried out using an aqueous dispersion of the resole resulting from the condensation of at least one phenol and formaldehyde in the presence of an alkaline catalyst.

29. A method according to claim 18, wherein the resole resin is condensed from at least one phenol and formaldehyde in the presence of an alkaline catalyst, in the proportions of 1 to 3 moles formaldehyde to 1 mole of the phenol used to form the resole resin.

30. A method according to claim 18, wherein the viscosity of the sulphonated novolac resin and of the resole resin, before reaction, are of the same order of magnitude.

31. A method according to claim 18, wherein the sulphonated novolac rsin and the resole resin are reacted in molar proportions of between 100 : 1 and 1 : 100.

32. A method according to claim 31, wherein the said proportions lie between 20 : 1 and 1 : 20.

33. A method according to claim 31, wherein the said proportions lie between 100 : 1 and 20 : 1 and a cross-linking agent is added to the reaction mixture.

34. A method according to claim 18, wherein the surfactant is a silicone oil.

35. A method according to claim 18, wherein the foaming agent is a low boiling aliphatic hydrocarbon.

36. A method according to claim 18, wherein the foaming agent is a halogenated derivative of a low boiling aliphatic hydrocarbon.

37. A method according to claim 18, wherein the exothermic heat of the reaction is used to activate the foaming agent.

* * * * *